UNITED STATES PATENT OFFICE.

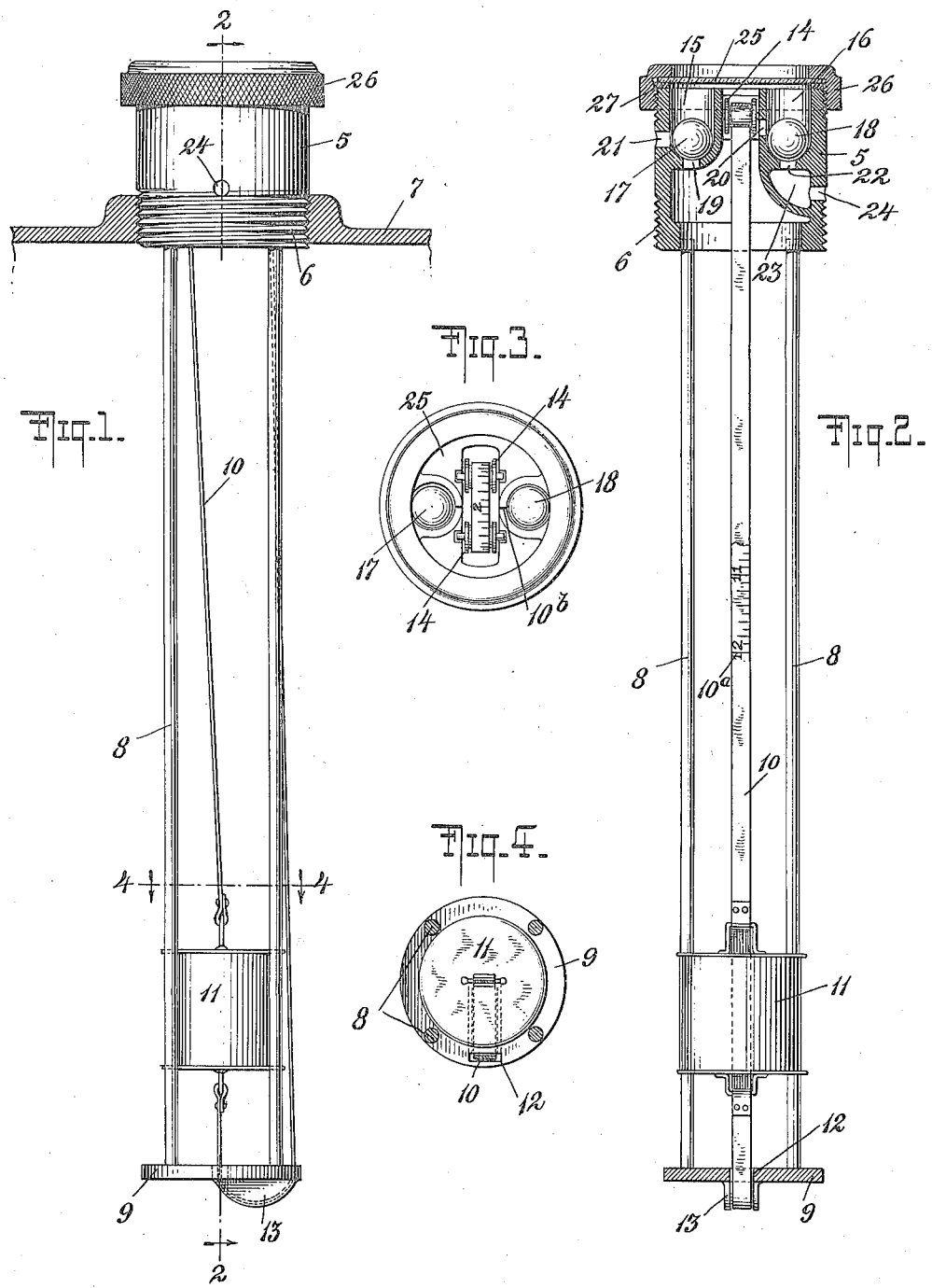

GEORGE B. FURMAN, OF EAST ORANGE, NEW JERSEY, ASSIGNOR TO L. O. KOVEN & BROTHER, A FIRM COMPOSED OF LUDOLPH O. KOVEN AND GUSTAVE H. KOVEN, OF NEW YORK, N. Y.

LIQUID-LEVEL INDICATOR.

1,257,693.  Specification of Letters Patent.  Patented Feb. 26, 1918.

Application filed June 6, 1914. Serial No. 843,367.

*To all whom it may concern:*

Be it known that I, GEORGE B. FURMAN, a citizen of the United States, and a resident of East Orange, Essex county, and State of New Jersey, have invented a certain new and useful Improvement in Liquid-Level Indicators, of which the following is a specification.

My invention relates to indicating devices for liquids and has for its object to provide a device of this type which is simple in construction and easily applied to a tank or other receptacle and which will accurately indicate the quantity of liquid contained in said receptacle or periodically withdrawn therefrom. A further object of my improvement is to so construct the device as to permit the receptacle to be readily filled and the liquid to be easily withdrawn therefrom in desired quantities without the necessity for any special manipulation of said device. My invention will be fully described hereinafter and the features of novelty will be pointed out in the appended claims.

Reference is to be had to the accompanying drawings which illustrate a specific example of my improvement and in which Figure 1 is an elevation of my device in position in the receptacle a portion of the latter being shown in section; Fig. 2 is a longitudinal section on the line 2—2 of Fig. 1; Fig. 3 is a plan view and Fig. 4 is a horizontal section on the line 4—4 of Fig. 1.

As illustrated in the drawings 5 is a casing or hood of any suitable material screw-threaded at 6 for detachable connection with a tank or other receptacle 7 in which any liquid may be contained, the said casing or hood 5 when in operative position opening into the said tank or receptacle 7. A plurality of guide rods 8 depend from said casing 5 into the tank and are arranged in spaced and parallel relation to each other with their lower ends secured to a plate 9, the said rods being of such length as to position the said plate 9 in close proximity to the bottom of the tank or other receptacle 7. A preferably flat tape 10 of flexible metal or other suitable material has its opposite ends connected with a float 11 of any desired construction slidably mounted between the rods 8, the said tape at the bottom passing through an opening 12 in the plate 9 and over a curved guiding surface 13 forming part of or secured to the said plate. At the top the tape passes over rollers 14 spaced from each other and journaled in the casing 5 whereby a portion of the tape at all times extends in a horizontal direction in said casing 5 and the one surface of said tape is thus exposed upwardly during its travel through said casing. As shown in the illustration the rollers 14 are journaled in the walls of valve chambers 15 and 16, said chambers containing ball valves 17 and 18 respectively and provided with apertures 19 and 20 which connect said chambers with the interior of the casing 5 and consequently with said tank or other receptacle 7. As is clearly shown in Fig. 2 of the drawings the aperture 19 is in the bottom wall of the chamber 15 below the valve 17 while the aperture 20 is located in the inside wall of the chamber 16 substantially above the valve 18. An opening 21 extends through the casing 5 and establishes communication between the chamber 15 and the atmosphere as clearly shown in Fig. 2. The chamber 16 is further provided in its bottom wall with an opening 22 located below the valve 18 and communicating with a chamber 23 which has no communication with the interior of the casing 5 or with the tank or other receptacle 7, but is connected with the atmosphere by means of an opening 24 extending through the casing 5 as is also clearly shown in Fig. 2. When the valves 17 and 18 are in their normal closed positions the interior of the casing 5 represents an air-tight chamber in which the tape 10 travels. With this arrangement the tank 7 is sealed excepting during the periodical operation of said valves during filling of the tank or while withdrawing liquid therefrom so that evaporation of the contents of said tank is reduced to a minimum. The upper or exposed end of the casing 5 is preferably composed of a plate 25 of glass or other transparent material beneath which the tape 10 passes in a path parallel therewith and through which plate the one surface of the tape is thus visible. The said plate 25 is secured in position in any suitable manner as by means of a ring 26 adapted for screw-threaded connection with said casing 5, a gasket or the like 27 being provided between the plate 25 and casing 5 to secure an air or vapor tight connection between these two elements. The outer surface of the tape 10 is provided with indications 10ᵃ properly spaced with respect to the capacity and area of the tank 7 and designating any suitable or desired units of measurement such as for instance quarts, pints and the like, one or more designations 10ᵇ being provided if desired within the casing 5 for coöperation with the indications 10ᵃ, as will be more fully described hereinafter. The designations 10ᵇ may be located at any suitable and proper points within the casing 5 and may be omitted if preferred, the operation in this latter case being also clearly set forth further on in the description. It will, of course, be understood that the tank or other receptacle with which the device is combined may be provided with a suitable filling aperture and closure therefor and with suitable tapping means as a faucet or the like through which the liquid may be withdrawn.

When the tank or other receptacle 7 is empty or substantially so, the float 11 will be located at or near the bottom thereof as shown in the drawings and the zero mark on the tape 10 when viewed through the plate 25 will be opposite or approximately in line with the designations 10ᵇ if these are used or otherwise will be at or substantially at the axial center of the casing or hood 5 thus indicating that the said tank or other receptacle is empty or nearly so. As liquid is introduced into the tank or receptacle 7 through the filling opening or otherwise the float 11 will gradually rise between the rods 8 as the quantity of liquid in the tank increases and the tape 10 will be carried along thereby and moved over the surface 13 and rollers 14. The indications 10ᵃ in this manner are successively moved beneath the transparent plate 25 so that the rise of the liquid in the tank may be accurately ascertained by observing said indications through said plate 25 and the supply cut off when the capacity of the tank has been reached or the desired amount has been introduced into same. As the quantity of liquid in the tank gradually increases the pressure of the air therein above the said liquid will raise the valve 17 from the aperture 19 and thus permit said air to escape into the atmosphere through the opening 21 whereby interruption of the filling action which otherwise would take place is prevented. At the same time the air pressure above mentioned will be exerted above the valve 18 through the opening 20 and will press said valve 18 firmly upon its seat to close the opening 22.

As the liquid is withdrawn either entirely or periodically in predetermined quantities the float 11 will gradually drop as the liquid flows out through the faucet or other tapping device and the tape 10 will again be carried along over the surface 13 and rollers 14 this time in the reverse direction, the indications 10ᵃ as before passing beneath and parallel to the plate 25 and being visible therethrough. The travel of the tape 10 and the progress of the said indications may thus be accurately noted and the quantity of liquid which is being withdrawn may in consequence be accurately determined. If the said indications 10ᵃ for instance designate quarts and divisions thereof the quantity of liquid which is passing out of said tank may be accurately measured in these units of measurement by simply first noting the particular indication 10ᵃ which is opposite the designation 10ᵇ or at the axial center of the casing 5 when the liquid starts to flow out of the tank and then keeping track of the indications 10ᵃ as they pass beneath the plate 25. Thus if it is desired to withdraw two quarts of liquid at a given time and the tape 10 stands with the indicating member 11 on the surface thereof opposite the designations 10ᵇ or the axial center of the casing 5 when the liquid starts to flow out, the flow is simply permitted to continue until the indicating number 9 on the surface of the tape 10 reaches the designations 10ᵇ or the axial center of the casing 5. If the flow is discontinued when this condition is reached exactly two quarts of liquid will have passed from the tank, the same proceeding being followed when greater or smaller quantities of liquid are to be withdrawn.

Similarly if it is desired to introduce only a predetermined quantity of liquid less than the capacity of the tank into the same, this may be done by simply noting the indications 10ᵃ as they pass beneath the plate 25 and discontinuing the filling operation when the indications 10ᵃ designating the predetermined quantity reaches the axial center of the casing 5. The float 11 will at all times follow the liquid as the level thereof rises or falls and will move the tape 10 correspondingly so that the condition of the contents of the tank as to quantity may at all times be quickly noted. The guide rods 8 serve to guide said float during its actuation by the liquid and at all times maintain it in a constant path, thus preventing the tape 10 from becoming twisted or otherwise injured or disarranged.

As the level of the liquid drops during the withdrawing operation, air will enter the chamber 23 through the opening 24 and will lift the valve 18 from the opening 22 and pass into the casing 5 and tank 7 through the aperture 20 and thus destroy any vacuum which tends to form in said tank as the said liquid flows out of the same. At the same time the valve 17 will be firmly maintained over the opening 19. It is thus impossible for a vacuum to be created in the tank which vacuum if permitted to form would finally arrest the outflow of the liquid which outflow in consequence is continuous and even until the tapping device is closed or shut off. The tank or other receptacle after being filled may thus be normally maintained in a sealed condition to prevent evaporation of the liquid therein or access thereto of any substance injurious or dangerous to said liquid. Any kind of liquids including those of an inflammable or explosive nature may thus be safely contained in said tank and may be introduced or withdrawn therefrom with a maximum of safety and with a minimum of effort.

It will of course be understood that other types of valves may be substituted for the valves 17 and 18 and also that the surface 13 may be replaced by other types of guiding means if this should be desired.

My improvement thus provides a simple and effective means which may be readily combined with any type of tank or other liquid receptacle and by means of which the amount of liquid in the tank at any time may be quickly and accurately noted, while the quantity of liquid filled in or withdrawn therefrom may be readily and accurately measured at all times, so that my invention in addition to being an indicating device may also be used as a measuring device.

Various changes in the specific form shown and described may be made within the scope of the claims without departing from the spirit of my invention.

I claim:

1. The combination of a receptacle for liquids, a casing extending exteriorly of said receptacle and connected therewith, said casing having a transparent end face, spaced guide rollers journaled in said casing, rods extending from said casing into said receptacle, guiding means at the inner ends of said rods, a float controlled by said liquid and movable between said rods, a tape connected with said float and movable thereby over said guide rollers and guiding means and across said transparent end face, said tape having indications successively visible through said transparent end face as said float is moved whereby the quantity of liquid in said receptacle or withdrawn therefrom is indicated.

2. The combination of a receptacle for liquids, a casing extending exteriorly of said receptacle and connected therewith, said casing having a transparent end face, spaced guide rollers journaled in said casing, rods extending from said casing into said receptacle, guiding means at the inner ends of said rods in the direction of their lengths, a float controlled by said liquid and movable between said rods, a tape connected with said float and movable thereby over said guide rollers and guiding means and across said transparent end face, said tape having indications successively visible through said transparent end face as said float is moved whereby the quantity of liquid in said receptacle or withdrawn therefrom is indicated and valves in said casing for automatically permitting air to escape from said receptacle as liquid is introduced into same and for admitting air to said receptacle as liquid is withdrawn therefrom.

3. The combination of a receptacle, a rigid support detachably connected with said receptacle and extending into same, guiding means located at spaced intervals on said support, a float movable on said support between said guiding means and an indicating tape passing over said guiding means and having its opposite ends connected with said float, said support, guiding means, float and tape being movable as a unit.

4. The combination of a receptacle, a casing connected therewith to form a normally air tight chamber and having a transparent horizontal end face, spaced guiding means in said casing beneath said transparent end face, an indicating tape movable in said air tight chamber over said spaced guiding means in a linear direction and in parallel relation to said end face and visible therethrough and a float in said receptacle connected with said tape and adapted to move same over said guiding means whereby the quantity of liquid in said receptacle or withdrawn therefrom is visibly indicated.

5. The combination of a receptacle, a tubular casing detachably connected therewith and having a transparent end face, a rigid frame extending from said casing into said receptacle, a pair of guide rollers journaled in said casing in spaced relation to each other and beneath said transparent end face, guiding means at the free end of said rigid frame, an indicating tape passing over said guiding means and over said guide rollers in parallel relation to said end face and visible therethrough, and a float movable on said frame and connected with the opposite ends of said tape and adapted to move the latter over said guide rollers whereby the quantity of liquid in said receptacle or withdrawn therefrom is visibly indicated.

6. The combination of a receptacle, a tubular casing detachably connected therewith and having a transparent end face, a rigid frame extending from said casing into said receptacle, a pair of guide rollers journaled in said casing in spaced relation to each other and beneath said transparent end face, guiding means at the free end of said rigid frame, an indicating tape passing over said guiding means and over said guide rollers in parallel relation to said end face, said tape being provided with indications successively visible through said end face, means in said casing adapted to coöperate with said indications whereby the quantity of liquid in said receptacle or withdrawn therefrom is indicated, and a float connected with said tape and controlled by said liquid and adapted to actuate said tape.

In testimony whereof I have hereunto set my hand in the presence of two subscribing witnesses.

GEORGE B. FURMAN.

Witnesses:
JOHN A. KEHLENBECK,
FRED A. KLEIN.